United States Patent [19]

Chamblee et al.

[11] Patent Number: 5,069,751
[45] Date of Patent: Dec. 3, 1991

[54] HYDROCYCLONE DEINKING OF PAPER DURING RECYCLING

[75] Inventors: Wayne J. Chamblee; Brian F. Greenwood, both of Glens Falls, N.Y.

[73] Assignee: Kamyr, Inc., Glens Falls, N.Y.

[21] Appl. No.: 564,656

[22] Filed: Aug. 9, 1990

[51] Int. Cl.⁵ .......................... B03D 1/02; B03D 1/24
[52] U.S. Cl. ........................................ 162/5; 209/170; 210/703
[58] Field of Search ................ 162/4, 5, 216, 380; 209/164, 170; 210/703, 221.2

[56] References Cited

U.S. PATENT DOCUMENTS

| | | | |
|---|---|---|---|
| 2,532,885 | 12/1950 | Berges . | |
| 2,849,930 | 9/1958 | Freeman et al. | 92/28 |
| 3,391,787 | 7/1968 | Salomon | 210/84 |
| 3,557,956 | 1/1971 | Braun et al. | 210/84 |
| 4,157,952 | 6/1979 | Krofta | 209/170 |
| 4,279,743 | 7/1981 | Miller | 209/211 |
| 4,331,534 | 5/1982 | Barnscheidt | 209/164 |
| 4,397,741 | 8/1983 | Miller | 209/170 |
| 4,399,027 | 8/1983 | Miller | 209/164 |
| 4,548,673 | 10/1985 | Nanda et al. | 162/4 |
| 4,744,890 | 5/1988 | Miller et al. | 209/164 |
| 4,749,473 | 6/1988 | Shioiri et al. | 209/164 |
| 4,838,434 | 6/1989 | Miller et al. | 209/164 |
| 4,861,165 | 8/1989 | Fredriksson et al. | 366/165 |
| 4,865,690 | 9/1989 | Bernard et al. | 162/4 |
| 4,952,308 | 8/1990 | Chamberlin et al. | 162/4 |

FOREIGN PATENT DOCUMENTS 2805445  9/1978  Fed. Rep. of Germany .......... 162/4

Primary Examiner—Richard V. Fisher
Assistant Examiner—Todd J. Burns
Attorney, Agent, or Firm—Nixon & Vanderhye

[57] ABSTRACT

Deinking of paper having print during the production of recycled paper is accomplished by a froth flotation process using a hydrocyclone. A finely comminuted liquid solids used paper suspension having a consistency of about 1 to 4% is introduced into a generally vertical axis vortex provided in a hydrocyclone. Air is sparged into the suspension in the vortex, by passing through a porous inner wall of the hydrocyclone, to cause ink particles to attach to the air bubbles and to rise in a foam while cellulosic pulp moves downwardly in the vortex. The foam—containing the ink particles—and the pulp are removed from the vortex in separate streams. The pulp is deaerated and the air component of the foam is removed in the cyclone. About 5–15% of the total flow of the suspension is removed with the foam in each stage, and about 95–85% with the pulp. In practicing the froth flotation a plurality of vertical axis hydrocyclones are connected together in-series, with a plurality of the series connected in parallel with a paper comminuting device (pulper) and a common outflow conduit.

16 Claims, 3 Drawing Sheets

HYDROCYCLONE DEINKING OF PAPER DURING RECYCLING

BACKGROUND AND SUMMARY OF THE INVENTION

In the production of recycled paper from used paper with print thereon, it is necessary to effect deinking. Deinking is often accomplished utilizing a froth flotation process, typically by using a large vat (e.g. 20-60 feet in diameter) into which a suspension having a consistency of about 0.8-1.5% is introduced. A typical vat for this purpose is shown in U.S. Pat. No. 4,331,534 (the disclosure of which is incorporated by reference herein). While the froth flotation practiced utilizing this technology is practical, it does not have flotation rates as high as desired, and does not lend itself to a totally enclosed pressurized system. With increasing interest in the production of recycled paper, it is desirable to increase the throughput and efficiency of the deinking (flotation) procedure, which can be a limiting stage of the recycled paper production process.

According to the present invention, deinking of recycled paper cellulosic pulp at enhanced throughput and efficiency levels is accomplished by utilizing hydrocyclones in the froth flotation process. Hydrocyclones, such as shown in U.S. Pat. No. 4,279,743 and 4,838,434, have been known for use in froth flotation in the mining industry for at least a decade, however the possible applicability thereof to deinking during the manufacture of recycled paper was not contemplated, no doubt due in part to the differences between the particles normally encountered in mining froth flotation processes, and the conditions typically encountered in froth flotation in the manufacture of recycled paper.

In order to adapt the hydrocyclone such as shown in said patents U.S. Pat. No. 4,279,743 and 4,838,434 to deinking, the consistency range of the suspension is typically limited to about 1-4%. This is a higher consistency range than in conventional deinking processes, where the suspension typically does not have a consistency of over 1.5%. This increased consistency range alone can result in increased energy efficiency and throughput is enhanced by the increased gravitational forces that exist in the hydrocyclone units utilized according to the invention. According to the invention, it is also highly desirable to deaerate the pulp discharged from the hydrocyclones, and it is necessary to adjust the amount of overflow and underflow withdrawn from the flotation units. According to the invention it is desirable to withdraw only the foam, but typically about 5-15% of the total flow of suspension is withdrawn in the rejects discharged from the hydrocyclone, while about 95-85% is withdrawn in the accepts stream.

According to one aspect of the present invention, a method of deinking recycled paper cellulosic pulp is provided, comprising the steps of sequentially and continuously: (a) Reducing paper having print thereon to a finely comminuted liquids-solids suspension flow having a low solids consistency. (b) Introducing the suspension into a generally vertical axis vortex. (c) Sparging air into the suspension in the vortex, to cause ink particles to attach to the air bubbles, and rise, a foam being formed, while cellulosic pulp moves downwardly in the vortex. And, (d) removing the foam and pulp from the vortex in a foam stream and a pulp stream distinct from the foam stream.

Step (a) of the above method is preferably practiced to provide a suspension having a solids consistency of about 1-4%, e.g. over 1.5%. Also, the following further steps are typically practiced: (e) deaerating pulp removed in the pulp stream in step (d); (f) separating the air component of the foam removed in step (d) from the solids and liquid component in the foam (by feeding the foam to a cyclone or other foam separating device); and the step (g), between steps (a) and (b), of breaking the suspension flow into a plurality of flow paths, and practicing steps (b)-(d) in each flow path, and recombining the pulp and flow streams from step (d) from all the flow paths. Steps (b)-(d) are also preferably practiced a plurality of times in in-series stages within each flow path. As earlier indicated, step (d) is preferably practiced to remove about 5-15% of the total flow of suspension in step (a) with the foam, and about 95-85% of the total flow of suspension in step (a) with the pulp.

The invention is utilized in the general process of manufacturing recycled paper, which comprises the steps of continuously: Reducing cellulosic paper having print thereon to a finely comminuted liquids-solids suspension flow having a low solids consistency. Screening and cleaning the suspension to remove reject particles. Subjecting the suspension to froth flotation to effect deinking of the cellulosic content of the suspension, to produce a deinked pulp. And, washing and thickening the cleaned pulp. Paper is made from the thickened pulp. The froth flotation step is practiced by: Introducing the suspension into a generally vertical axis vortex. Sparging air into the suspension in the vortex, to cause ink particles to rise in a foam, while cellulosic pulp moves downwardly in the vortex. And, removing the foam and pulp from the vortex in a foam stream and a pulp stream distinct from the foam stream.

The invention also contemplates apparatus for deinking paper pulp. The apparatus comprises: Means for comminuting paper having print thereon to provide a low consistency suspension, and having an outlet; and a plurality of vertical axis hydrocyclones, each having a substantially hollow body with a top and bottom, a suspension inlet adjacent the top, an interior porous wall, means for sparging air into the body by passing it through the interior wall, an overflow outlet adjacent the top, and an underflow outlet adjacent the bottom. The hydrocyclones are disposed so that a plurality of them are connected in series, with the underflow outlet from one connected to the suspension inlet of the next; and a plurality of series are provided, connected in parallel with the comminuting means outlet and a common underflow conduit. Deaerating means preferably are disposed in the common underflow conduit, for deaerating the pulp.

It is the primary object of the present invention to provide increased efficiency and throughput during the deinking of pulp by the froth flotation process. This and other objects of the invention will become clear from an inspection of the detailed description of the invention, and from the appended claims.

DETAILED DESCRIPTION OF THE DRAWINGS

Figure 1:
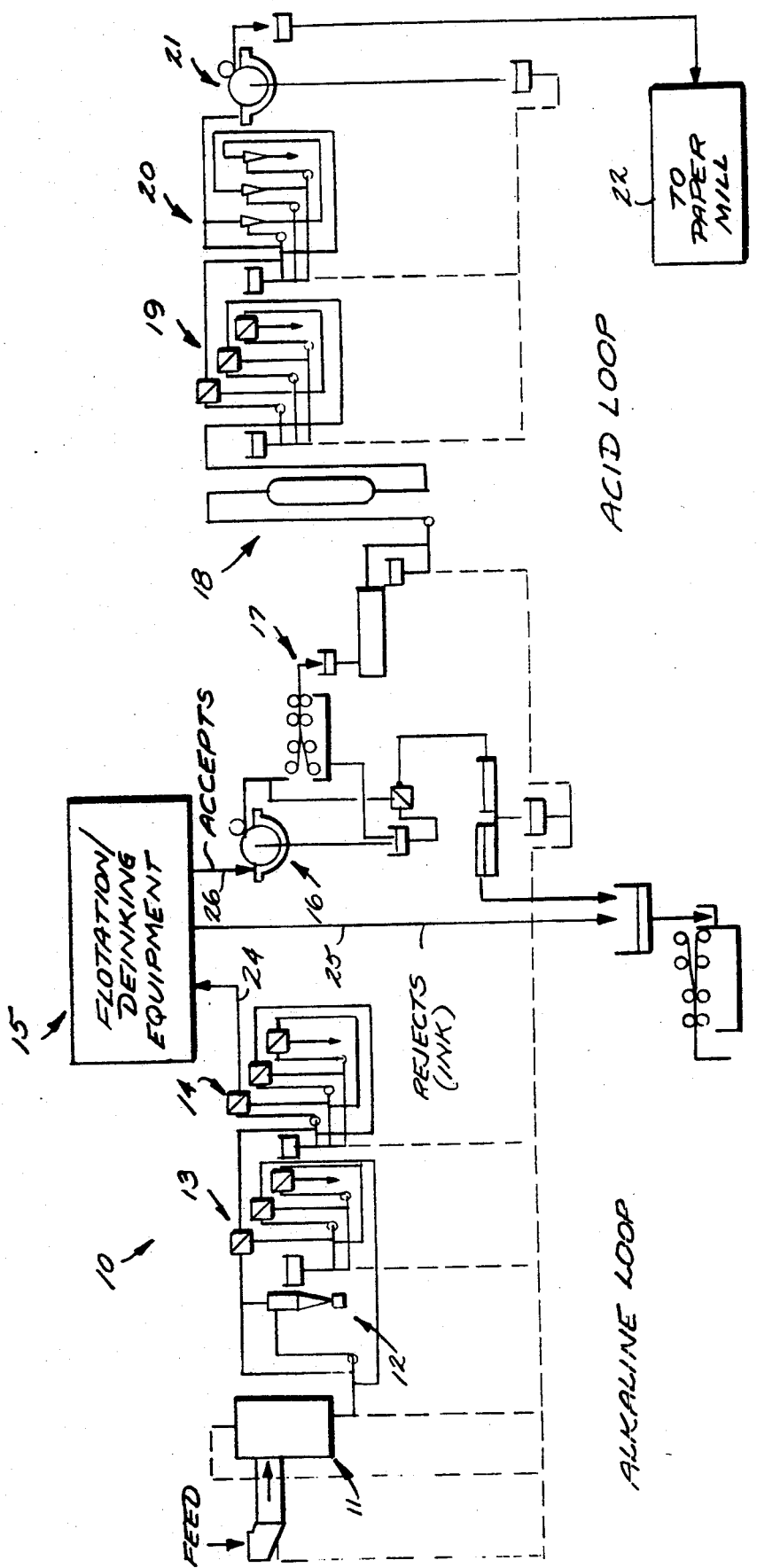
FIG. 1 is a schematic view of a typical system for producing recycled paper, showing the froth flotation apparatus according to the invention.

FIG. 1 illustrates one conventional system for producing recycled paper, the system being illustrated generally by reference numeral 10. The exact sequencing of the components may be changed and some components deleted depending upon the composition of the feedstock, or other parameters.

Used paper, having print thereon which may have a component of virgin wood fiber—is fed into a conventional pulper 11 which comminutes the cellulosic feed to provide a liquids-solids suspension. The suspension—which in accordance with the invention—is diluted to a solids consistency of about 1-4%, passes to one or more high density cleaners 12, coarse screens 13, fine screens 14, and then to a froth flotation system 15. The accepts from the froth flotation system 15 pass to a washer 16, dispersion apparatus 17, an optional bleaching stage 18, fines screens 19, and cyclone cleaners 20, and then is thickened at thickener 21 and discharged to a paper mill 22 where it is formed into recycled paper. The feed of suspension into the froth flotation system 15 is through inlet 24, while the rejects (e.g. ink particles) pass in overflow conduit 25, and the accepts (pulp) in underflow outlet 26.

During the practice of the recycled paper production procedure, typically the suspension will have a temperature of about 30°-60° C. (at least in system 15). In dispersion and bleaching the temperature may be as high as 90° C. The liquid for providing the suspension is primarily water, but also may include other chemicals to facilitate separation of the ink from the comminuted paper, or to otherwise enhance the process. For example, as disclosed in U.S. Pat. No. 4,331,534, hydrogen peroxide, sodium hydroxide, waterglass, and a washing agent (e.g. Soap-Olinor ®) a surfactant may be added directly into the pulper 11, or at another suitable stage.

Figure 2:
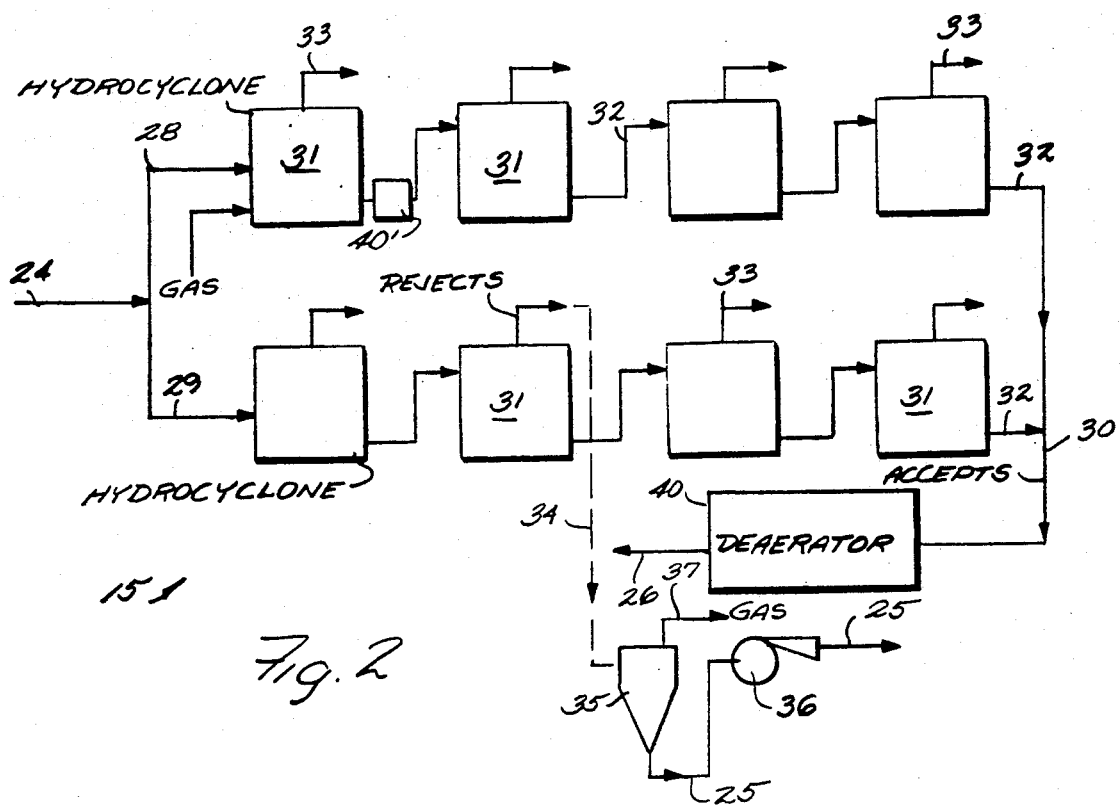
FIG. 2 is a detail schematic view of the froth flotation system according to the invention.

The froth flotation system 15 according to the present invention is illustrated schematically in FIG. 2. The suspension inlet 24 preferably is broken into a plurality of flow paths 28, 29. While only two flow paths are illustrated in FIG. 2, it is to be understood that there may be many more parallel flow paths, depending upon the particular requirements of the plant 10. The flow paths 28, 29 reconnect in a common outlet conduit 30 for accepts (pulp).

Disposed in each flow path 28, 29 is a plurality of series connected hydrocyclones 31. Each hydrocyclone 31 has an accepts (pulp) outlet 32, and a rejects (ink particles and foam) outlet 33. The outlets 33 also reconnect in a common conduit 34, which passes through a cyclone 35 in which the air component is removed. The particle and liquid components (e.g. ink and water) of the rejects is discharged into rejects conduit 25, while the gas component is withdrawn through the top of the cyclone 35, and discharged at 37. The gas in conduit 37 may be recycled to the hydrocyclones 31 as inlet gas, treated, discharged, or otherwise acted upon. The rejects in stream 25 may be pumped by pump 36 to a fiber recovery system. The fiber recovery system may consist of additional stages of air sparged hydrocyclones, conventional froth flotation cells, thickeners/washers or other means of fiber recovery. The recovered fiber may be returned to the inlet flow to the hydrocyclones (e.g. to line 24).

In the froth flotation system 15 of FIG. 2, it is also preferably desirable to deaerate the pulp in the accepts conduit 30. This is accomplished by passing the conduit 30 into a conventional deaerating apparatus 40, the deaerated pulp being discharged in accepts conduit 26. It may be necessary to deaerate between units 31 in place of or in addition to deaeration at 40. For example a deaertor 40' may be provided between each series connected hydrocyclones 31 as illustrated in FIG. 2. The deaerators 40, 40' may be cyclones, degassing pumps, or like conventional degassing units.

Figure 3:
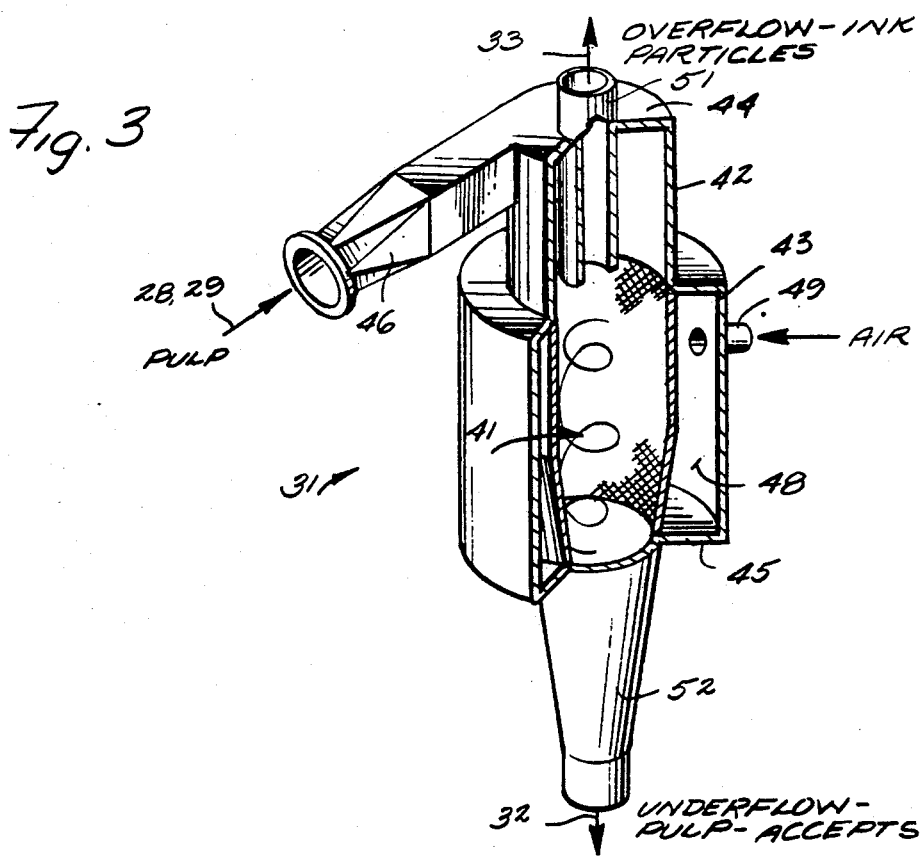
FIG. 3 is a top perspective view, with portions of the structure cut away for clarity of illustration, of an exemplary hydrocyclone utilizable in the system of FIG. 2.

A typical hydrocyclone 31 according to the present invention is illustrated more clearly in FIG. 3. The hydrocyclone 31 is used to establish a generally vertical axis vortex 41.

The basic construction of the hydrocyclone 31 is as shown in U.S. Pat. Nos. 4,279,743 and 4,399,027. It includes a hollow cylindrical body having a generally vertical axis, the body preferably being in step form, as indicated by body portions 42, 43 in FIG. 3. The body 42, 43 has a top 44, and a bottom 45. The suspension inlet 46 is adjacent the top 44, and provides for the introduction of the suspension in flow paths 28, 29, etc.

Disposed within the interior of the body portion 43 is a porous interior wall 47. The porous wall 47 is surrounded plenum 48, and sparging air (gas) is introduced into the plenum 48 by air inlet 49, the air passing through the porous wall 47 and moving radially inwardly, then upwardly to entrain ink particles in the suspension within a foam.

The sparging air introduced into the vortex 41 passes through the high shear boundary layer in the hydrocyclone 31, creating a froth of very fine bubbles. The bubbles then attach to hydrophobic ink particles trapped in the suspension. The bubbles and attached ink particles migrate to the froth zone near the center of the vortex 41, under the influence of the centrifugal forces present in the unit, and then to overflow outlet 51 at the top 44 of the device 31. The accepts/pulp is withdrawn through the outlet 52 adjacent the bottom 45 of the hydrocyclone 31. The sparging air introduction through inlet 49, and other components are operated so that typically about 5-15% of the mass flow of suspension into inlet 46 is removed through overflow 51 (with the foam), while about 95-85% of the flow of suspension into the inlet 46 exits the pulp outlet 52.

The hydrocyclone may take a wide variety of different forms. Another exemplary form, which is illustrated (along with many other embodiments) in U.S. Pat. No. 4,838,434, is shown generally by reference numeral 131 in FIG. 4. In the FIG. 4 embodiment all structures comparable to those in the FIG. 3 embodiment are illustrated by the same reference numeral only preceded by a "1".

Figure 4:
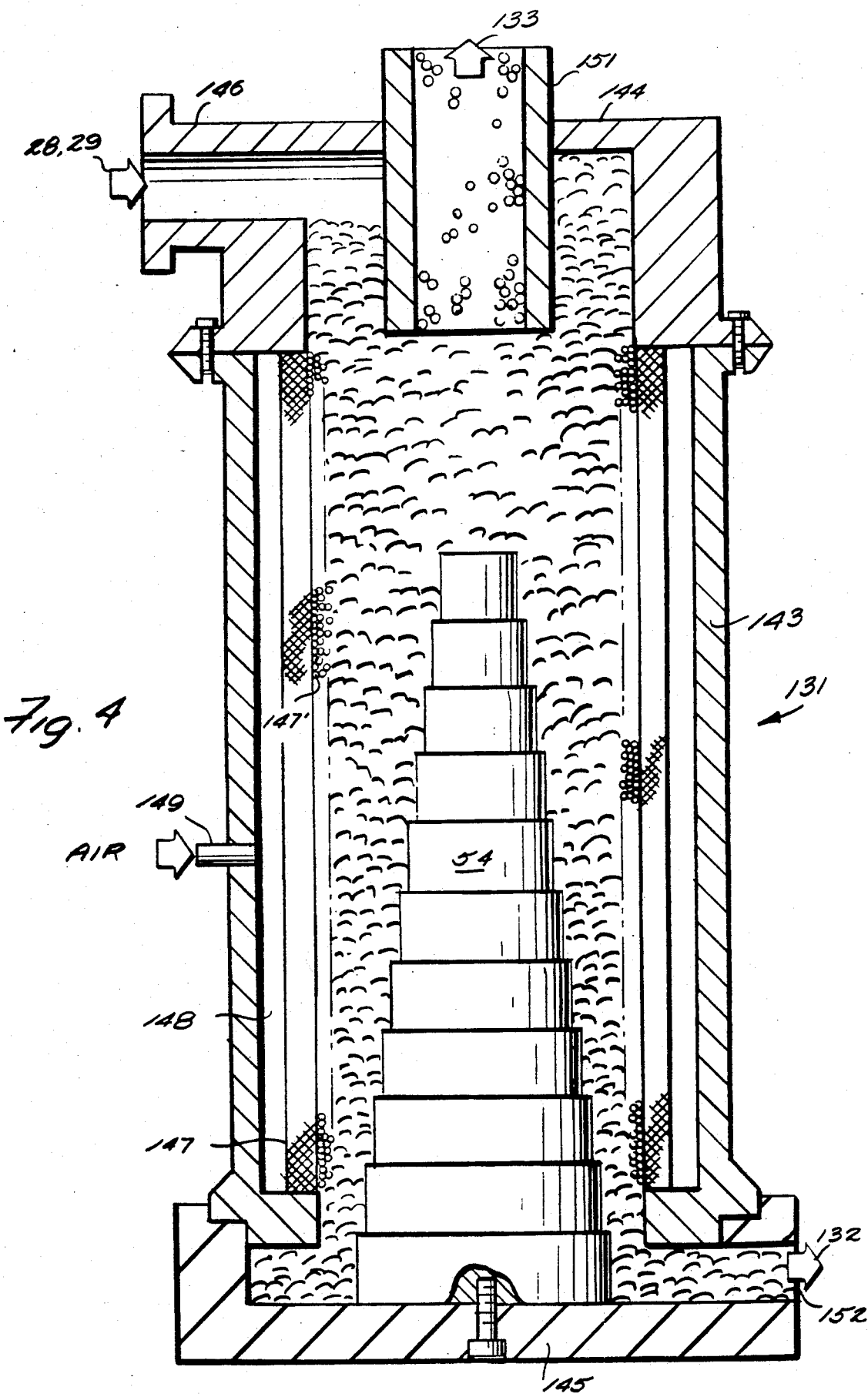
FIG. 4 is a side schematic cross-sectional view of another exemplary embodiment of hydrocyclone utilizable according to the invention.

The major distinctions of the embodiment of FIG. 4 over that of FIG. 3 are: The provision of the porous interior wall in the form of the porous wall 147 itself, with an inner surface 147' against which a swirl layer of suspension forms. The sparging gas is introduced at 149, and the accepts stream 132 is withdrawn from the hydrocyclone 131, just above the bottom 145. Disposed interiorly of the hollow body 143, preferably extending upwardly from the bottom 145, is a generally conical pedestal 54, which may have any of the configurations illustrated in said U.S. Pat. No. 4,838,434, and which may have a mechanical or hydraulic means associated with it to increase or decrease the pedestal diameter and/or height to control operation of the hydrocyclone 131.

Utilizing the apparatus according to the invention, paper having print thereon is reduced in pulper 11 to a finely comminuted liquids-solids suspension flow having a low solids consistency. The suspension—in line 26—is introduced into a generally vertical axis vortex by introducing a tangential inlet 46 to the top of the hollow body 42. Air is sparged into the suspension in the vortex 41, being introduced through inlet 49 and passing through porous wall 47, to cause ink particles in the suspension to rise in a foam, while the cellulosic pulp moves downwardly in the vortex 41. The foam is removed in the foam stream through overflow outlet 51, while the pulp is removed in a pulp stream through underflow outlet 52, distinct from the overflow outlet 51. The pulp is deaerated in deaerater 40, and then passes on to be washed at stage 16, and otherwise conventionally processed, as illustrated in FIG. 1. The rejects in overflow outlet 51 ultimately have the air removed therefrom as in cyclone 35, with the ultimate rejects (including the removed ink) passing in rejects conduit 25, and treated in a conventional manner. During the practice of the froth flotation process in the system 15, the suspension typically has a temperature of about 30°-60° C, and typically is at a consistency of about 1-4% (e.g. over 1.5%).

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A method of deinking recycled paper cellulosic pulp, comprising the steps of sequentially and continuously:
    (a) reducing paper having print thereon to a finely comminuted liquid-solids suspension flow having a solids consistency of about 1-4%;
    (b) introducing the suspension into a first end of a vortex;
    (c) sparging air into the suspension in the vortex, to cause ink particles to attach to air bubbles and move back toward the first end, a foam being formed of air and attached ink particles, while cellulosic pulp moves toward a second end in the vortex, opposite the first end; and
    (d) removing the foam and pulp entrained in the foam from the vortex in a foam stream, and removing a pulp stream distinct from the foam stream.

2. A method as recited in claim 1 comprising the further step (e) of mechanically deaerating the pulp removed in the pulp stream in step (d).

3. A method as recited in claim 1 wherein step (d) is practiced to remove about 5-15% of the total flow of suspension in step (a) with the foam, and about 95-85% of the total flow of suspension in step (a) with the pulp.

4. A method as recited in claim 3 comprising the further step (f) of separating the gas component of the foam removed in step (d) from the solids and liquid component of the foam.

5. A method as recited in claim 4 wherein step (f) is practiced by feeding the foam to a cyclone.

6. A method as recited in claim 1 using a vertical axis hydrocyclone having an air permeable side wall, an overflow outlet from the top, and an underflow outlet from the bottom, and wherein steps (b)-(d) are practiced by introducing the suspension into the hydrocyclone, directing air through the side wall of the hydrocyclone to create a foam of fine bubbles which thereby attach to ink particles trapped in the suspension to be carried with foam to the overflow outlet, and withdrawing the pulp from the underflow outlet.

7. A method as recited in claim 1 comprising the further step (g), between steps (a) and (b), of breaking the suspension flow into a plurality of flow paths, and practicing steps (b)-(d) in each flow path, and recombining the pulp and foam flow streams from step (d) from all the flow paths.

8. A method as recited in claim 7 comprising the further step of practicing steps (b)-(d) a plurality of times in in-series stages within each flow path.

9. A method as recited in claim 8 comprising the further step of mechanically deaerating the pulp between each stage within each flow path.

10. A method as recited in claim 1 wherein step (a) is practiced to provide a suspension having a temperature of about 30°-60° C.

11. A method as recited in claim 1 wherein step (a) is practiced to provide the liquid component of the suspension as primarily water, but also including other chemicals to facilitate separation of ink from comminuted paper.

12. A method as recited in claim 1 wherein step (a) is practiced to provide a suspension having a solids consistency between over 1.5 to about 4%.

13. A method of manufacturing recycled paper, comprising the steps of continuously: reducing cellulosic paper having print thereon to a finely comminuted liquid-solids suspension flow having solids consistency of about 1-4%; screening the suspension to remove reject particles; subjecting the suspension to froth flotation to effect deinking of the cellulosic content of the suspension, to produce a deinked pulp; washing and thickening the pulp; and making paper from the thickened pulp; wherein said froth flotation step is practiced by:
    introducing the suspension into a first end of a vortex;
    sparging air into the suspension in the vortex, to cause ink particles to move back toward the first end in a foam of air and attached ink particles, while cellulosic pulp moves toward a second end in the vortex, opposite the first end; and
    removing the foam and pulp entrained in the foam from the vortex in a foam stream and removing a pulp stream distinct from the foam stream.

14. A method as recited in claim 13 using a vertical axis hydrocyclone for the froth flotation step, the hydrocyclone having an air permeable side wall, an overflow outlet from the top, and an underflow outlet from the bottom; and wherein said introducing, sparging, and removing steps are practiced by introducing the suspension into the hydrocyclone adjacent the top thereof, directing air through the wall of the hydrocyclone to disrupt the boundary layer in the hydrocyclone and thereby releasing ink trapped in suspension solids to be carried with foam to the overflow outlet, and withdrawing the pulp from the underflow outlet.

15. A method as recited in claim 13 wherein the froth flotation comprises the further step of mechanically deaerating the pulp after passage through the vortex.

16. A method as recited in claim 13 wherein the froth flotation is practiced with the suspension having a solids consistency between over 1.5 to about 4%.

* * * * *